United States Patent [19]
Morimoto et al.

[11] Patent Number: 5,855,331
[45] Date of Patent: Jan. 5, 1999

[54] REEL UNIT FOR DUAL-BEARING REEL

[75] Inventors: Shinichi Morimoto, Nishinomiya; Masakazu Iwabuchi, Sakai, both of Japan

[73] Assignee: Shimano, Inc., Japan

[21] Appl. No.: 935,746

[22] Filed: Sep. 23, 1997

[30] Foreign Application Priority Data

Oct. 1, 1996 [JP] Japan ................................. 8-260585
Aug. 29, 1997 [JP] Japan ................................. 9-234501

[51] Int. Cl.⁶ .............................................. A01K 89/015
[52] U.S. Cl. ............................................................. 242/310
[58] Field of Search ................................. 242/310, 313, 242/323

[56] References Cited

U.S. PATENT DOCUMENTS

| | | | |
|---|---|---|---|
| 2,261,629 | 11/1941 | Murphy | 242/316 |
| 2,639,869 | 5/1953 | Levine | 242/316 |
| 3,771,741 | 11/1973 | Stein | 242/323 |
| 4,750,684 | 6/1988 | Morimoto | 242/310 |
| 4,798,354 | 1/1989 | Nanbu et al. | 242/310 |
| 4,871,126 | 10/1989 | Myojo et al. | 242/323 |

*Primary Examiner*—John P. Darling
*Attorney, Agent, or Firm*—Jeffer, Mangels, Butler & Marmaro LLP

[57] ABSTRACT

The reel unit for a dual-bearing reel is a reel unit for a dual-bearing reel in which a fishing line is wound onto a rotating spool, and comprises a frame, first and second covers, a front cover, and a fishhook stopping component. The frame has a pair of side plates disposed to the left and right of the spool, and a plurality of linking components that link the side plates. The first and second covers are mounted so as to cover the sides of the side plates. The front cover is mounted so as to cover the front of the frame, and in it is formed an opening that is longer horizontally and that faces the fishing line guide of a level winding mechanism. The fishhook stopping component is a rod-shaped member positioned along the opening and to the outside of and at a distance from the front cover.

20 Claims, 7 Drawing Sheets

REEL UNIT FOR DUAL-BEARING REEL

FIELD OF THE INVENTION

The present invention relates to a reel unit, and more particularly to a reel unit for a dual-bearing reel having a level winding mechanism.

BACKGROUND OF THE INVENTION

Bass fishing and other forms of lure fishing often call for the use of a dual-bearing reel called a bait casting reel. A dual-bearing reel generally comprises a reel unit, a spool that is rotatably supported by the reel unit, a handle that rotationally drives the spool, and a level winding mechanism for winding the fishing line evenly onto the spool.

The reel unit is equipped with a frame having a pair of side plates that are positioned some distance apart to the left and right and that have the spool positioned between them, and a plurality of linking components that link the side plates. The reel unit is also equipped with a pair of side cover members and a front cover member. The side cover members are mounted so as to cover the sides of the side plates. The front cover member covers the front portion between the side plates. In the front surface of the front cover member there is formed an opening facing the fishing line guide mechanism of the level winding mechanism. Because of their complex curved shapes, these cover members are most often made from a synthetic resin.

When lure fishing is performed using a dual-bearing reel such as this, a common practice is called palming, in which the reel is gripped along with the rod in a manner such that the reel unit is covered by the palm of the left hand from the left side, and the handle is turned with the right hand.

When a fisherman is lure fishing with a dual-bearing reel such as this and decides to move to another spot, he usually hooks the fishhook mounted on the lure in the opening of the reel unit. When the fishhook is thus hooked into the opening of the reel unit, the lure does not swing around, making it less likely that the fishhook will snag something. With the above-mentioned conventional reel unit, however, when the fishhook is stopped in the opening of the reel unit, there is the danger that the metal fishhook will damage the cover members of the reel unit, which are made of synthetic resin. Also, since the reel unit is covered with cover members made of synthetic resin, the reel unit is easily scratched when the metal fishhook is stopped somewhere other than the opening.

A need exists for a reel unit that is not easily scratched when a metal fishhook is stopped on it.

SUMMARY OF THE PREFERRED EMBODIMENTS

In accordance with a first aspect of the present invention, there is provided a reel unit for a dual-bearing reel in which a fishing line is wound onto a rotating spool. The reel unit includes a frame, a pair of side cover members, a front cover, and a fishhook stopping component. The frame has a front portion and includes a pair of side plates which have outer sides and which are disposed to the left and right of the spool, and a plurality of linking components that link the side plates. The pair of side cover members is mounted so as to cover the outer sides of the side plates. The front cover has an outer surface and is mounted so as to cover the front portion of the frame. The fishhook stopping component is affixed to the front cover and spaced from the outer surface of the front cover.

When a fishhook is stopped at the fishhook stopping component, the fishhook stopping component is positioned to the outside of and at a distance from the front cover member, so the fishhook will tend not to hit the reel unit, and the reel unit will tend not be scratched. Furthermore, since the fishhook stopping component is positioned in front of the reel unit, the fishhook stopping component does not get in the way of palming.

In a first preferred embodiment, the fishhook stopping component is formed from a rod-shaped member, such as a metal wire or elongated cylinder. The rod-shaped member can have a circular cross-section, or can have other cross-sectional shapes such as ellipses, polygons, etc.

In a second preferred embodiment, the front cover has defined in its front surface a transverse opening, and the fishhook stopping component is positioned above the opening. In this embodiment, it is easier to stop the fishhook on the fishhook stopping component since the fishhook stopping component is positioned above, or along, the opening.

In another preferred embodiment, the front cover is mounted on the frame such that it can swing and can move forward and backward. In this embodiment, it is easier to thread the fishing line into the level winding mechanism since the front cover opens and closes.

According to a more specific preferred embodiment, the front cover has a support component that is supported by the frame against a force that pulls it forward. In this embodiment, the front cover member does not easily come off the frame when pulled. Accordingly, the front cover member does not easily open when the fishing line is pulled in a state in which the fishhook is stopped at the fishhook stopping component provided to the front cover.

In a further preferred embodiment, the fishhook stopping component has a lateral portion having two ends, and a pair of side portions. The lateral portion is positioned above the opening, for example, to the left and right along the upper side of the opening. The pair of side portions respectively extend from each end of the lateral portion to the front cover member and are affixed thereto. In this embodiment, since the fishhook stopping component extends above along the upper side of the opening, preferably a good distance from the fishing rod, the lure to which the fishhook is mounted does not get in the way of the stopping of the fishhook, and even a fishhook mounted to a lure can be easily stopped at the fishhook stopping component.

In yet another preferred embodiment, the fishhook stopping component is a bent metal wire. In this embodiment, the fishhook stopping component can be manufactured simply, just by bending a wire. Furthermore, the provision of a fishhook stopping component comprising a bent metal wire adds a fresh look to the design of the product.

According to another aspect of the present invention, there is provided a dual-bearing reel which includes a spool, a handle, a gear mechanism for transmitting rotational force from the handle to the spool, and a reel unit as described herein.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
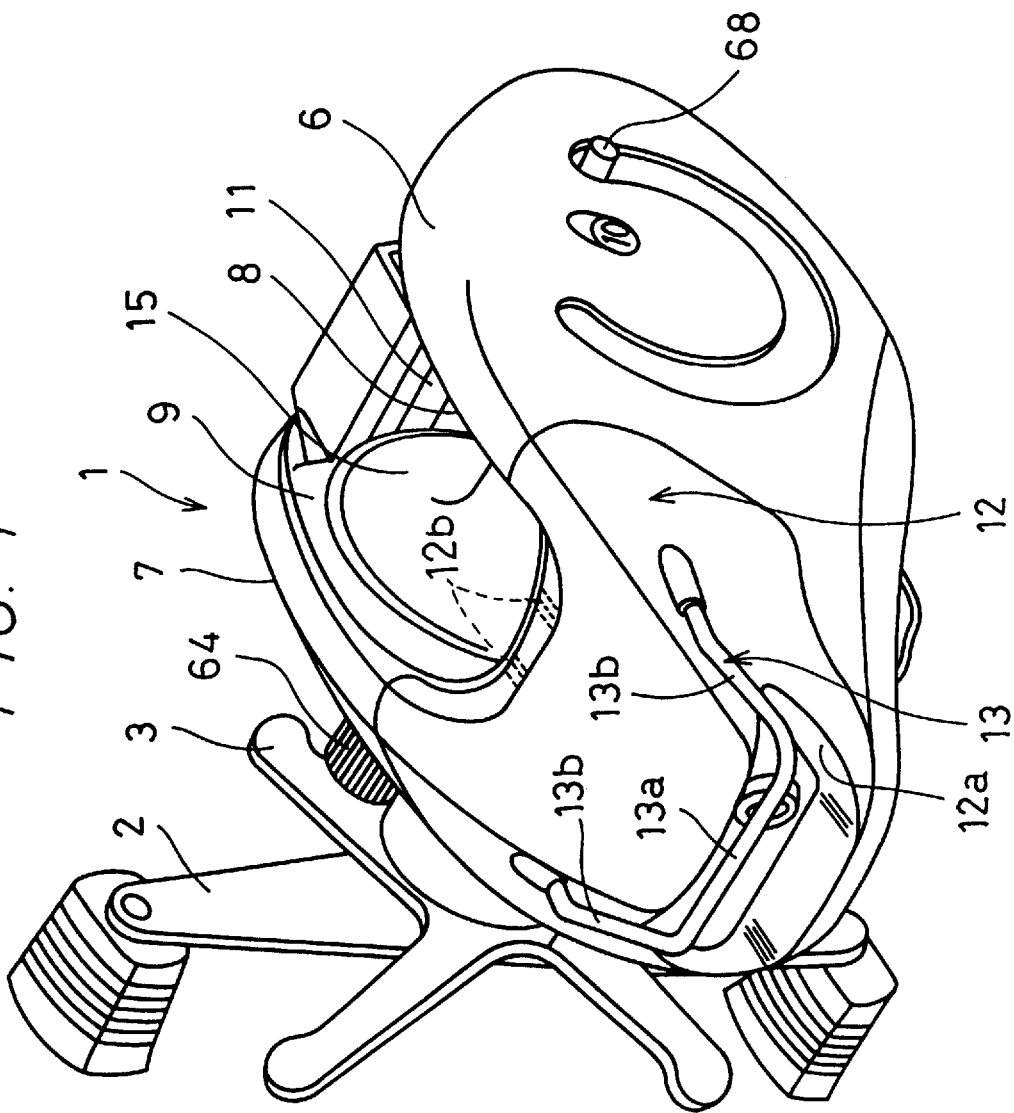
FIG. 1 is an oblique view of an embodiment of a dual-bearing reel of the present invention.

In FIG. 1, a bait casting reel, which is a dual-bearing reel pertaining to an embodiment of the present invention, comprises a reel unit 1, a spool rotating handle 2 positioned to the side of the reel unit 1, and a star drag 3 for adjusting the drag, which is positioned on the side of the handle 2 adjacent reel unit 1.

Figure 2:
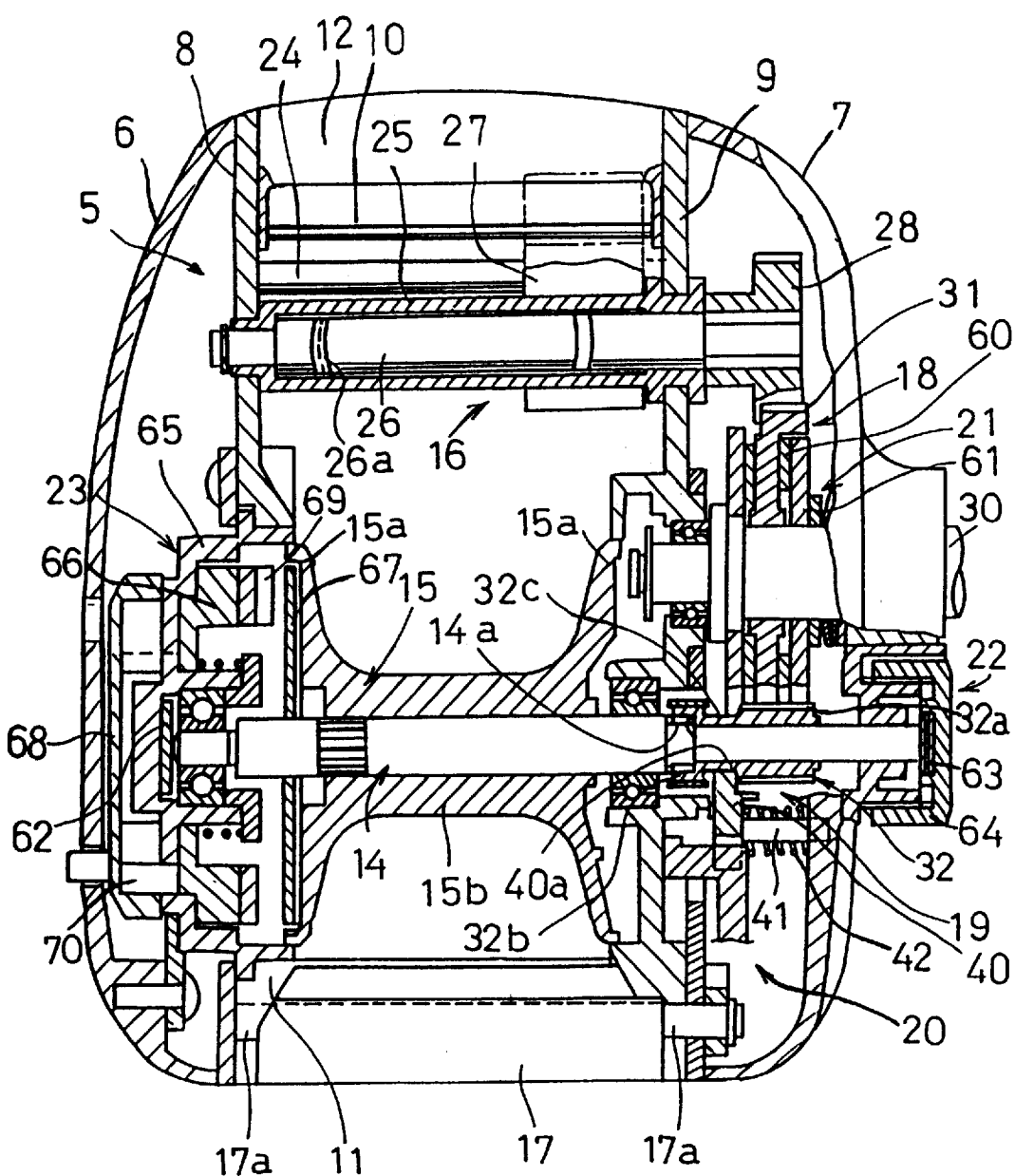
FIG. 2 is a cross sectional plan view of the dual-bearing reel of FIG. 1.

As shown in FIG. 2, the reel unit 1 has a frame 5, preferably made from a synthetic resin, and first and second covers 6 and 7 that preferably are made of a synthetic resin and are mounted on the sides of the frame 5. The frame 5 has a pair of side plates 8 and 9 positioned such that they face each other a specific distance apart, and a plurality of linking components 11 (only the rear component is shown in the figure) that link side plates 8 and 9.

Figure 4:
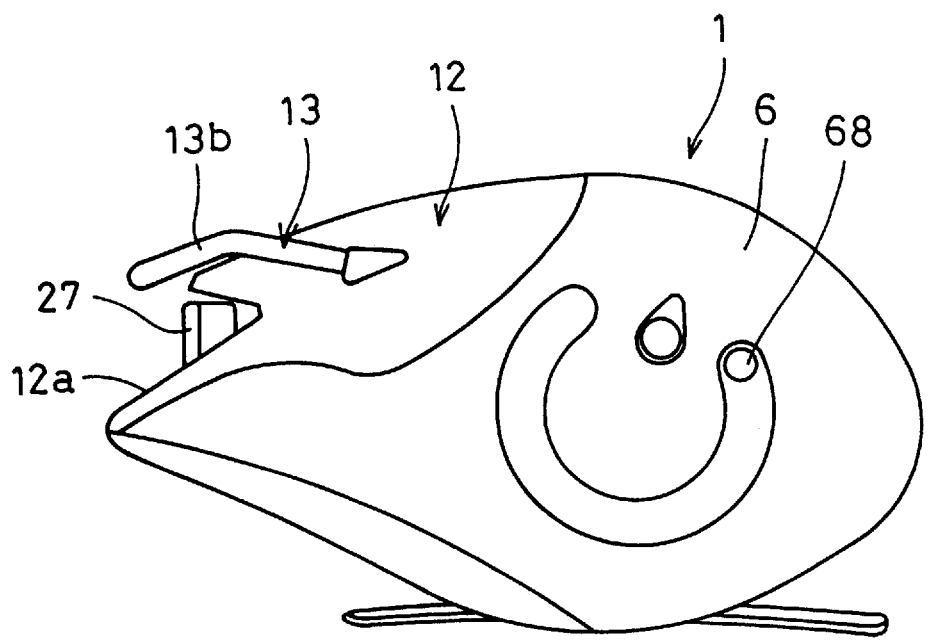
FIG. 4 is a right side view of the dual-bearing reel of FIG. 1.
Figure 5:
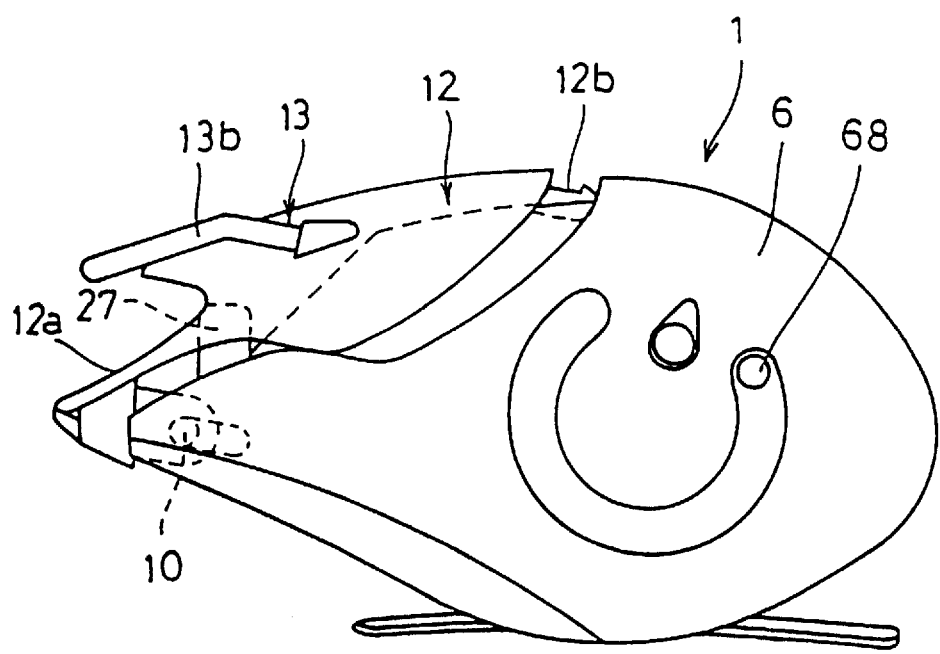
FIG. 5 is a right side view of the dual-bearing reel of FIG. 1 in which the front cover is in the forwarding position
Figure 6:
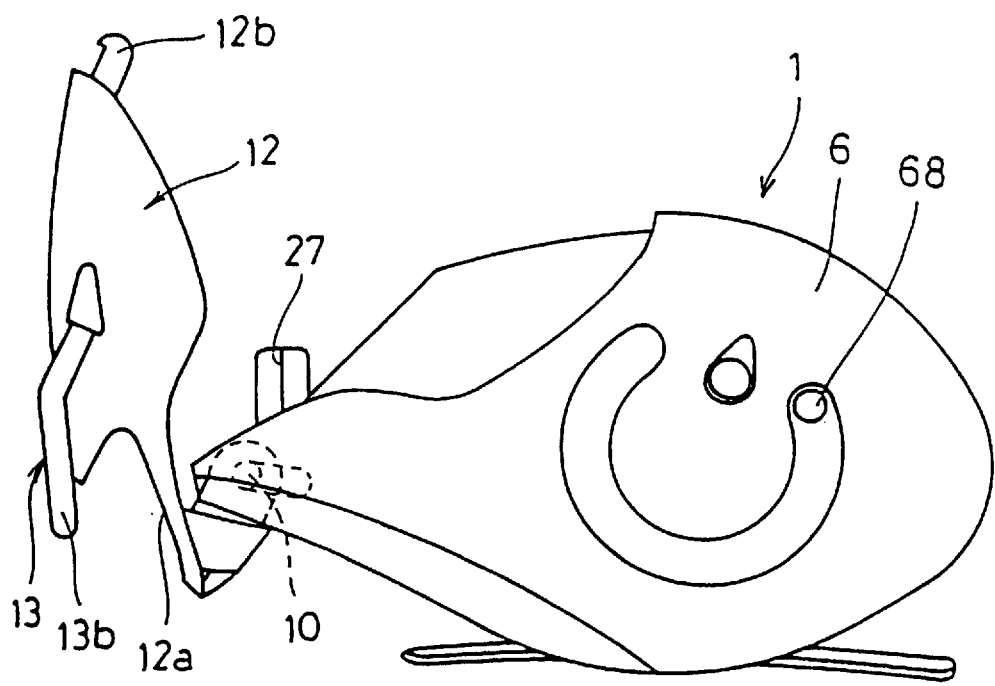
FIG. 6 is a right side view of the dual-bearing reel of FIG. 1 in which the front cover is in the opening position.

A front cover 12 that opens and closes is mounted on the front portion of the frame 5 as shown in FIGS. 1, 2, 5 and 6. The front cover 12 is mounted such that it can swing and move backward and forward on a swing shaft 10 that bridges the front portion (the upper portion in the figure) of the side plates 8 and 9. The front cover 12 moves backward and forward between a mounting position as shown in FIG. 4 and a forwarding position as shown in FIG. 5, and is pivotable from the forwarding position to an opening position as shown in FIG. 6. The illustrated mounting structure is similar to that disclosed in Japanese utility model laid-open application publication no. Showa 63-33780.

Figure 3:
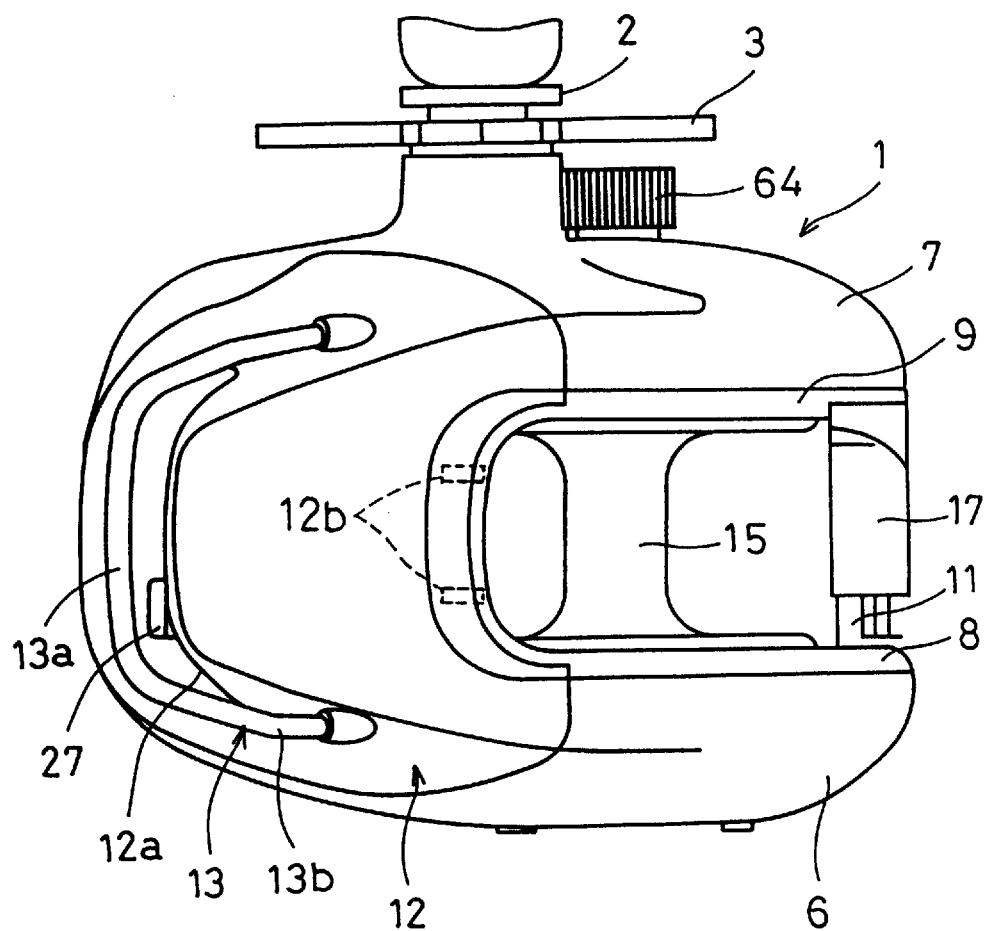
FIG. 3 is a plan view of the dual-bearing reel of FIG. 1.

The front cover 12 has at its front portion a transverse, i.e., horizontally-longer opening 12a that faces the fishing line guide 27 of a level winding mechanism 16 (discussed below). A fishhook stopping component 13 is provided in front of and a distance away from the upper portion of this opening 12a. The front cover 12 also has on the inner side of its upper edge a pair of support tabs 12b that are supported by the frame 5 as shown in FIGS. 1 and 3. The front cover 12 is supported by these support tabs 12b on the frame 5 against a force that pulls it forward. Such a force is exerted, for example, through the fishhook stopping component 13 when a hook stopped at component 13 is pulled by a fishing line to which the hook is attached.

As shown in FIGS. 1, 3, and 4, the fishhook stopping component 13 preferably is formed by the bending of rod-shaped member, in particular a metal wire. The fishhook stopping component 13 has a transverse (horizontal) portion 13a positioned to the left and right along the upper side of the opening 12a, and a pair of side portions 13b fixed from both ends of the transverse portion 13a to the sides of the front cover 12. The side portions 13b are bent from both ends of the transverse portion 13a and extend approximately diagonally upward along the sides of the front cover 12, are then further bent so that they extend diagonally downward, and are fixed at their distal ends to the sides of the front cover 12. The fishhook stopping component 13 preferably is fixed to the front cover 12 by press fitting the distal ends of the side portions 13b into holes formed in the front cover 12 while the entire assembly is vibrated ultrasonically. Other methods for attaching fishhook stopping component 13 to front cover 12 can also be used if desired.

Fishhook stopping component 13 is provided for the purpose of hooking a fishhook, for example a fishhook mounted to a lure or other simulated bait.

When the fishhook stopping component 13 is thus provided, the fishhook can be stopped without scratching the reel unit 1. When a bent wire is used to form the fishhook stopping component 13, it adds a fresh look to the design that is not found in other reels. Also, since the fishhook stopping component 13 is spaced from the outer surface of the cover 12, is provided to the upper portion of the opening 12a at a distance in front of the opening 12a, there is a suitable distance from the fishing rod such that the lure to which the fishhook is mounted does not get in the way of the stopping of the fishhook, and even a fishhook mounted to a lure can be easily stopped at the fishhook stopping component 13.

A spool 15, a level winding mechanism 16 for winding the fishing line evenly onto the spool 15, and a thumbrest 17 that is used when thumbing is performed are positioned inside the frame 5 as shown in FIG. 2. Between the frame 5 and the second cover 7 are positioned a gear mechanism 18 that is used to transmit the rotational force from the handle 2 to the spool 15 and the level winding mechanism 16, a clutch mechanism engagement 19 that is used to engage and disengage the clutch, an engagement control mechanism 20 that is used to control the engagement and disengagement of the clutch according to the operation of the thumbrest 17, a drag mechanism 21, and a casting control mechanism 22 that is used to adjust the resistance during rotation of the spool 1 5. Between the frame 5 and the first cover 6 is positioned a magnetic brake mechanism 23 that is used to minimize backlash during casting.

The spool 15 has a flange 15a on each side, and has a winding drum 15b between the two flanges 15a. The spool 15 is fixed to a spool shaft 14 that passes through the center thereof. The spool shaft 14 is rotatably supported on the frame 5 by a bearing, and the end on the second cover 7 side passes through the second cover 7 and extends until it protrudes to the side.

The level winding mechanism 16 has a guide tube 25 fixed between the pair of side plates 8 and 9, a threaded shaft 26 that is rotatably supported inside the guide tube 25, and a fishing line guide 27. A gear 28 that constitutes the gear mechanism 18 is fixed to the end of the threaded shaft 26. A spiral intersecting groove 26a is formed in the threaded shaft 26, and part of the fishing line guide 27 meshes with this spiral groove 26a. Accordingly, when the threaded shaft 26 is turned via the gear mechanism 18, the fishing line guide 27 moves back and forth along the guide tube 25.

The gear mechanism 18 has a master gear 31 that is fixed to a handle shaft 30, a pinion 32 that meshes with the master gear 31, and the above-mentioned gear 28 that is fixed to the end of the threaded shaft 26.

The pinion 32 has a tooth component 32a that is formed around the outside at one end, a meshing component 32b that is formed on the other end, and a small diameter component 32c that is formed between the tooth component 32a and the meshing component 32b. An engagement groove is formed in the center of the meshing component 32b, allowing for engagement with or disengagement from an engagement protrusion 14a formed on the spool shaft 14. This meshing component 32b of the pinion 32 and the engagement protrusion 14a of the spool shaft 14 constitute a clutch mechanism. Here, when the pinion 32 moves outward and the engagement groove of the meshing component 32b thereof is disengaged from the engagement protrusion 14a of the spool shaft 14, the rotational force from the handle shaft 30 is not transmitted to the spool shaft 14.

The thumbrest 17 is positioned to the rear of the spool at the rear (the lower portion in FIG. 2) between the pair of side plates 8 and 9. Slots (not shown) are formed in the side plates 8 and 9 of the frame 5, and the rotation shaft 17a of the thumbrest 17 is rotatably supported in these slots. Accordingly, it is possible for the thumbrest 17 to slide up and down in these slots. The front surface of the thumbrest 17 strikes the rear linking component 11, and the angle at which it can rotate is therefore limited.

The clutch mechanism engagement 19 has a clutch yoke 40. The clutch yoke 40 is positioned around the outside of the spool shaft 14, and is supported by two pins 41 such that it can move parallel to the axis of the spool shaft 14. The spool shaft 14 is capable of relative rotation with respect to the clutch yoke 40. That is, rotation of the spool shaft 14 is not accompanied by rotation of the clutch yoke 40. Also, the clutch yoke 40 has in its center an engagement component 40a that engages with the small diameter component 32c of the pinion 32. Around the outside of each of the pins 41 that support the clutch yoke 40, a spring 42 is positioned between the clutch yoke 40 and the second cover 7, so that the clutch yoke 40 is constantly energized to the inside (toward the frame 5) by the springs 42.

With a design such as this, in a normal state the pinion 32 is in the clutch engagement position, and the meshing component 32b thereof engages with the engagement protrusion 14a of the spool shaft 14, resulting in a clutch engagement state. When the pinion 32 is moved outward by the clutch yoke 40, the engagement between the meshing component 32b and the engagement protrusion 14a is released, resulting in a clutch disengagement state.

The engagement control mechanism 20 moves the clutch yoke 40 outward according to the vertical sliding of the thumbrest 17.

The drag mechanism 21 has a friction plate 60 that is pressed upon by the master gear 31, and a pressing plate 61 that is used to press the friction plate 60 at a specific force by means of the rotational operation of the star drag 3.

The casting control mechanism 22 has a plurality of plates 62 and 63 positioned so as to sandwich the spool shaft 14, and a cap 64 that is used to adjust the force at which the spool shaft 14 is squeezed. Female threads are formed around the inner periphery of the cap 64, and these mesh with the male threads formed on the second cover 7 side.

The magnetic brake mechanism 23 has a brake case 65, a magnet holder 66 provided to the inside of the brake case 65, a conductor member 67 such as an aluminum plate that faces the magnet holder 66, and a knob 68 for adjusting the braking force. The brake case 65 is fixed to one of the side plates 8, and the conductor member 67 is fixed to the spool shaft 14. The magnet holder 66 is positioned inside the brake case 65, and has a plurality of magnets 69 on the surface across from the conductor member 67. Two pins 70 (only one is shown in the figure) that protrude to the cap 64 side are fixed to the back side (the other side) of the magnet holder 66. A swash plate cam is formed on the inner peripheral surface of the knob 68, and the pins 70 strike this swash plate cam. With a design such as this, rotation of the knob 68 allows the gap between the magnets 69 and the conductor member 67 to be adjusted via the pins 70, and allows the braking force to be adjusted.

The reel operation will now be described.

When casting is to be performed, the thumbrest 17 is pushed down. This moves the clutch yoke 40 outward. The pinion 32 that is engaged with the clutch yoke 40 is also moved in the same direction. In this state, the meshing between the meshing component 32b of the pinion 32 and the engagement protrusion 14a of the spool shaft 14 is released, resulting in a clutch off state. The spool 15 is able to rotate freely in this clutch off state. When the fishing rod is grasped with the right hand and the rod is cast while thumbing is performed in this clutch off state, the fishing line is played out by the centrifugal force of the lure.

When the line is played out and the lure lands in the desired spot on the water, the reel is switched to the left hand and grasped along with the rod in palming style, and the right hand is placed on the handle 2. In this palming state, the fishhook stopping component 13 does not get in the way of the palming since it is fastened to the front cover 12. The handle 2 is then turned a little to engage the clutch, the rod and reel are operated so as to move the lure, and the fisherman waits for a hit from a fish. At this time, if the handle 2 is rotated, the spool 15 will rotate in the winding direction. When a fish hits the lure, the handle 2 is turned and the line is reeled in.

When the line has been reeled in and the fisherman is ready to move to a new spot, for example, the fishhook mounted to the lure is hooked onto the fishhook stopping component 13 in a clutch on state. Because this fishhook stopping component 13 is positioned in front of and at a distance from the opening 12a, it is easy to hook the fishhook onto it, and the front cover 12 and the other covers 6 and 7 are not prone to scratching. If the line is reeled in to take up any slack in this state, the fishhook will not come off the fishhook stopping component 13 so easily.

Figure 7:
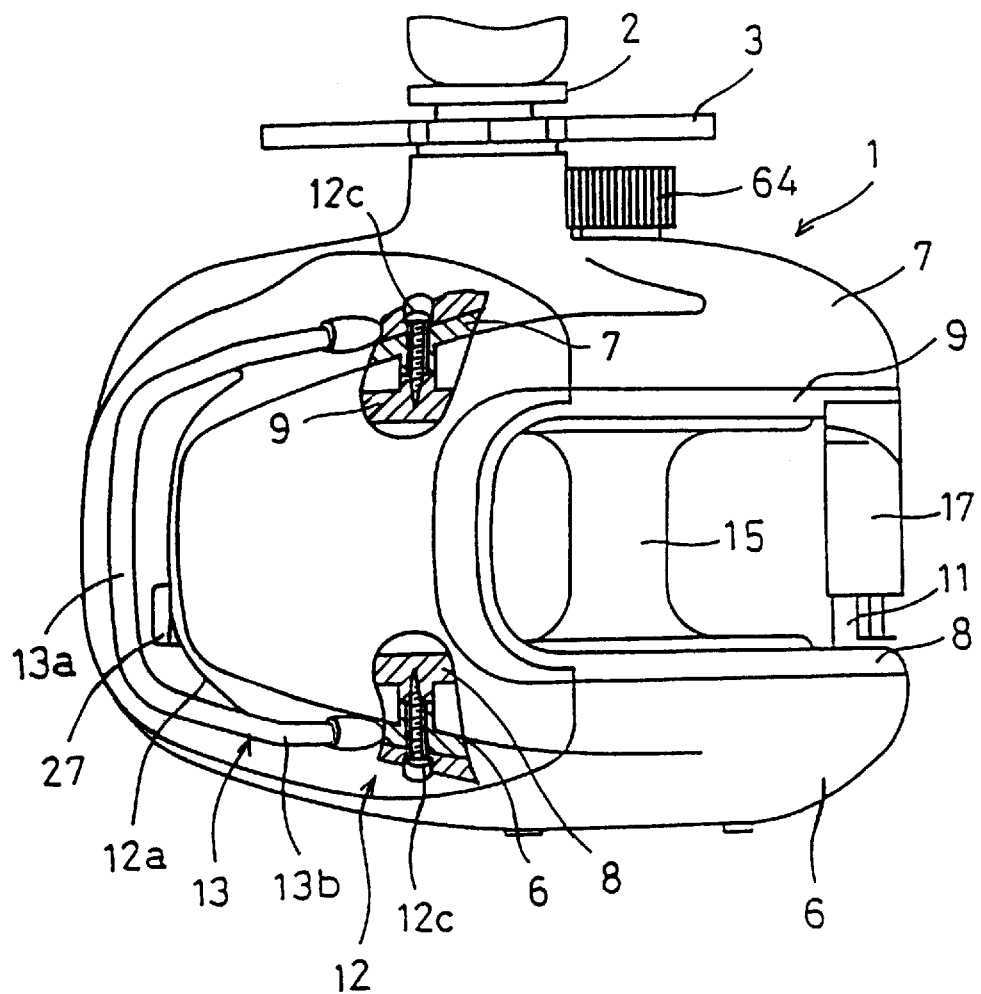
FIG. 7 is a cross-sectional plan view of an alternative embodiment of a dual-bearing reel of the invention.

The front cover 12 can be mounted on the frame 5 to be movable between mounting, forwarding and opening positions as described above. In an alternative embodiment, the front cover 12 can be fixed to the frame 5 as shown in FIG. 7. In this embodiment, front cover 12 is fixed to the side plates 8, 9 of the frame 5 by two tap screws 12c, one tap screw 12c extending through the first cover 6 and the other tap screw 12c extending through the second cover 7. Thus, the front cover 12 is fixed to the frame 5, the fishhook stopping component 13 provided at this location will not move, and even if the fishhook is pulled (for example due to the elasticity of a fishing rod to which the reel is affixed), the fishhook will not be disengaged from fishhook stopping component 13. Additionally, the fixing position does not have to be restricted to the frame 5, but can also be fixed to the side covers 6, 7.

The location of the fishhook stopping component 13 is not limited to the upper side of the opening 12a, and may instead be on any other portion of the outside of the front cover 12.

The material of the fishhook stopping component 13 is not limited to metal, and may instead be a synthetic resin, wood, or any other material, as long as it is rod-shaped.

What is claimed is:

1. A reel unit for a dual-bearing reel in which a fishing line is wound onto a rotating spool, said reel unit comprising:
   a frame comprising a pair of side plates, said side plates having outer sides, and a plurality of linking components that link said side plates, said frame having a front portion;
   a pair of side cover members mounted so as to cover said outer sides of said side plates;
   a front cover having an outer surface, said front cover being mounted so as to cover said front portion of said frame; and
   a fishhook stopping component affixed to said front cover and spaced from said outer surface of said front cover.

2. A reel unit for a dual-bearing reel as defined in claim 1, wherein said fishhook stopping component is formed from a rod-shaped member.

3. A reel unit for a dual-bearing reel as defined in claim 1, wherein said front cover has defined in its front surface a transverse opening, and said fishhook stopping component is positioned above said opening.

4. A reel unit for a dual-bearing reel as defined in claim 3, wherein said fishhook stopping component has a lateral portion having two ends, said lateral portion being positioned above said opening, and a pair of side portions respectively extending from each end of said lateral portion, said side portions being affixed to said front cover.

5. A reel unit for a dual-bearing reel as defined in claim 1, wherein said front cover is mounted on said frame such that said front cover swings and moves forward and backward.

6. A reel unit for a dual-bearing reel as defined in claim 5, wherein said front cover is mounted on said frame by tap screws that pass through said pair of side plates respectively.

7. A reel unit for a dual-bearing reel as defined in claim 5, wherein said front cover comprises a support component that is supported by said frame against a force that pulls it forward.

8. A reel unit for a dual-bearing reel as defined in claim 4, wherein said fishhook stopping component has a lateral portion having two ends, said lateral portion being positioned above said opening, and a pair of side portions respectively extending from each end of said lateral portion, said side portions being affixed to said front cover.

9. A reel unit for a dual-bearing reel as defined in claim 1, wherein said fishhook stopping component is a bent metal wire.

10. A dual-bearing reel comprising:
    (a) a reel unit comprising:
        (i) a frame comprising a pair of side plates, said side plates having outer sides, and a plurality of linking components that link said side plates, said frame having a front portion;
        (ii) a pair of side cover members mounted so as to cover said outer sides of said side plates;
        (iii) a front cover having an outer surface, said front cover being mounted so as to cover said front portion of said frame; and
        (iv) a fishhook stopping component affixed to said front cover and spaced from said outer surface of said front cover;
    (b) a spool disposed between said side plates of said frame;
    (c) a handle; and
    (d) a gear mechanism for transmitting rotational force from said handle to said spool.

11. A dual-bearing reel as defined in claim 10, further comprising a level winding mechanism, wherein said gear mechanism transmits rotational force from said handle to said level winding mechanism.

12. A dual-bearing reel as defined in claim 10, further comprising a drag mechanism disposed between said reel unit and said handle.

13. A dual bearing reel as defined in claim 10, wherein said fishhook stopping component is formed from a rod-shaped member.

14. A dual-bearing reel as defined in claim 10, wherein said front cover has defined in its front surface a transverse opening, and said fishhook stopping component is positioned above said opening.

15. A dual-bearing reel as defined in claim 14, wherein said fishhook stopping component has a lateral portion having two ends, said lateral portion being positioned above said opening, and a pair of side portions respectively extending from each end of said lateral portion, said side portions being affixed to said front cover.

16. A dual-bearing reel as defined in claim 10, wherein said front cover is mounted on said frame such that said front cover swings and moves forward and backward.

17. A dual-bearing reel as defined in claim 16, wherein said front cover is mounted on said frame by tap screws that pass through said pair of side plates respectively.

18. A dual-bearing reel as defined in claim 16, wherein said front cover comprises a support component that is supported by said frame against a force that pulls it forward.

19. A dual-bearing reel as defined in claim 16, wherein said fishhook stopping component has a lateral portion having two ends, said lateral portion being positioned above said opening, and a pair of side portions respectively extending from each end of said lateral portion, said side portions being affixed to said front cover.

20. A dual-bearing reel as defined in claim 10, wherein said fishhook stopping component is a bent metal wire.

* * * * *